US007209732B2

(12) United States Patent
Nejah et al.

(10) Patent No.: US 7,209,732 B2
(45) Date of Patent: Apr. 24, 2007

(54) AUDIO SCRAMBLER AND RECORDER FOR CELLULAR TELEPHONES

(75) Inventors: Allen Nejah, San Jose, CA (US); Armand Gambera, Los Altos, CA (US)

(73) Assignee: SunMan Engineering, Inc., San Jose, CA (US)

( * ) Notice: Subject to any disclaimer, the term of this patent is extended or adjusted under 35 U.S.C. 154(b) by 37 days.

(21) Appl. No.: 11/044,113

(22) Filed: Jan. 26, 2005

(65) Prior Publication Data

US 2006/0165234 A1 Jul. 27, 2006

(51) Int. Cl.
*H04L 9/00* (2006.01)

(52) U.S. Cl. ........................ 455/411; 380/270; 380/247

(58) Field of Classification Search ................ 455/410, 455/411, 412.1, 414.1, 423, 550.1; 380/52, 380/6, 8, 9, 33, 49, 270, 250, 247
See application file for complete search history.

(56) References Cited

U.S. PATENT DOCUMENTS 5,787,180 A * 7/1998 Hall et al. .................... 380/52
6,782,102 B2 * 8/2004 Blanchard et al. .......... 380/270
2003/0061493 A1 * 3/2003 Angelo et al. .............. 713/189
2005/0245234 A1 * 11/2005 Stopek ........................ 455/411

OTHER PUBLICATIONS

"Cordless Telephone Scrambler FX128," CML Semiconductor Products Data Sheet, D/128/1 Oct. 1997, pp. 1-10.

* cited by examiner

*Primary Examiner*—George Eng
*Assistant Examiner*—Sam Bhattacharya
(74) *Attorney, Agent, or Firm*—Patent Law Group LLP; David C. Hsia

(57) ABSTRACT

A security device for a cellular telephone includes a cellular telephone interface for coupling the device to the cellular telephone, a microphone, a speaker, and an analog scrambler coupling the microphone and the speaker to the cellular telephone interface. The scrambler is able to scramble voice audio from the speaker and unscramble voice audio from the cellular telephone. The device may further include a radio tuner for providing radio audio to the user through the speaker, and a recorder for recording the voice and the radio audios.

10 Claims, 1 Drawing Sheet

AUDIO SCRAMBLER AND RECORDER FOR CELLULAR TELEPHONES

FIELD OF INVENTION

This invention relates to a security device for cellular telephones, specifically to an audio scrambler for cellular telephones.

DESCRIPTION OF RELATED ART

Analog cellular telephones are vulnerable to eavesdropping. The radio signals they transmit can be monitored using readily available radio receivers, commonly called scanners. Although digital cell phone transmissions are digitally scrambled for better protection, eavesdroppers with the right equipment may be able to unscramble them. Furthermore, the encryption is often only used to protect the call while it is in the air between the base station and the cellular telephone. During its route through the telephone network (which may again include wireless links), the call is not protected by encryption.

Thus, what is needed is a device that provides additional security to cellular telephones.

BRIEF DESCRIPTION OF THE DRAWINGS

Use of the same reference numbers in different figures indicates similar or identical elements.

SUMMARY

Figure 1:
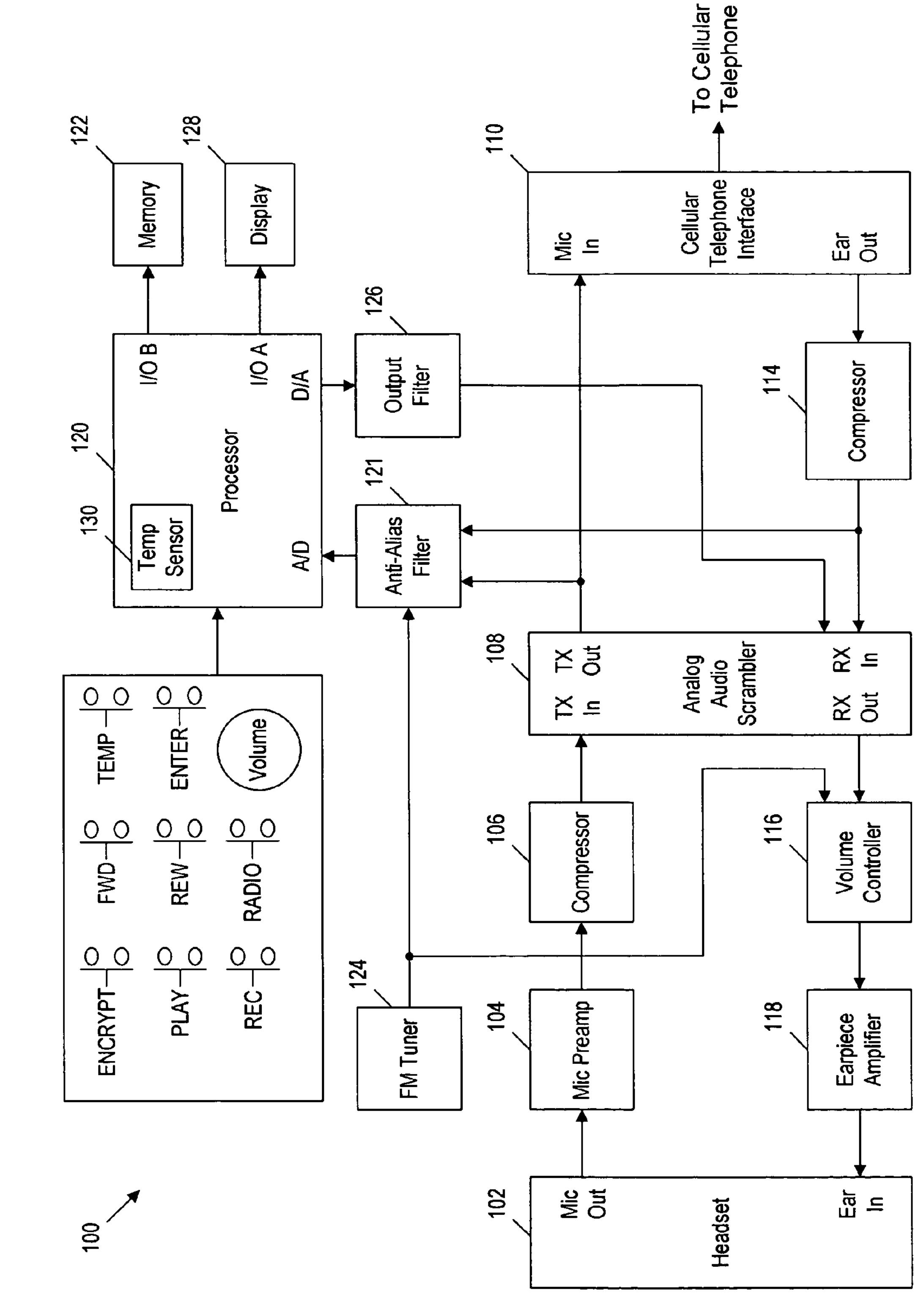
FIG. 1 is a block diagram of a security device for cellular telephones in one embodiment of the invention.

In one embodiment of the invention, a security device for a cellular telephone includes a cellular telephone interface for coupling the device to the cellular telephone, a microphone, a speaker, and an analog scrambler coupling the microphone and the speaker to the cellular telephone interface. The analog scrambler is able to scramble voice audio from the speaker and unscramble voice audio from the cellular telephone. The device may further include a radio tuner for providing radio audio to the user through the speaker, and a recorder for recording the voice and the radio audios.

DETAILED DESCRIPTION

FIG. 1 is a block diagram of a security device 100 for a cellular telephone in one embodiment of the invention. To enhance the security of a cellular telephone call between two users, each user has a device 100 plugged into his or her cellular telephone. Device 100 allows the two users to have a secure conversation by scrambling and unscrambling their voices in analog. Device 100 also allows the user to listen to radio, record voice and radio audios for playback, and measure ambient temperature.

Encryption Mode

To enhance the security of a cellular telephone call, a user presses an "ENCRYPT" button to put device 100 into an encryption mode. In response, a processor 120 enables an analog duplex scrambler 108 to scramble voice audio from the user to the cellular telephone, and to unscramble voice audio from the cellular telephone to the user. When processor 120 does not enable scrambler 108, the voice audios merely pass through scrambler 108. In one embodiment, processor 120 is an integrated circuit (IC) chip model number MSP430FG437 from Texas Instruments of Austin, Tex. Processor 120 includes the random access memory (RAM) for storing data and a flash memory for storing the firmware that operate device 100. Additional components of device 100 are now described in reference to a transmit (TX) path of voice audio from the user to the cellular telephone.

Device 100 may include a headset 102. Alternatively, the user may provide his or her own headset 102. Headset 102 includes a microphone and a speaker (e.g., an earpiece). The microphone converts the voice of the user into analog audio signals. The output of the microphone (labeled "Mic Out") is coupled to the input of a microphone preamplifier 104.

Microphone preamplifier 104 conditions the audio signals received from the microphone by providing a gain and filtering out background noises. The output of preamplifier 104 is coupled to the input of a compressor 106. In one embodiment, preamplifier 104 is an IC chip model number MAX9812 from Maxim of Sunnyvale, Calif. Compressor 106 compresses the dynamic range of the audio signals received from preamplifier 104. The output of compressor 106 is coupled to the TX input of an analog scrambler 108 (labeled "TX In"). In one embodiment, compressor 106 is an IC chip model number SSM2167-1RM-R2 from Analog Devices of Norwood, Mass. Analog scrambler 108 scrambles the audio signals received from compressor 106. The TX output of scrambler 108 (labeled "TX Out") is coupled to an input of a cellular phone interface 110 (labeled "Mic In"). In one embodiment, scrambler 108 is an IC chip model number FX128 from CML Microcircuits (USA) Inc. of Winston-Salem, N.C.

Cellular phone interface 110 is coupled to a headset interface of the cellular telephone (not shown). In one embodiment, interface 110 is an audio jack and the headset interface is an audio plug. Interface 110 passes the scrambled audio signal to the cellular telephone for transmission to the other party on the call.

Device 100 is now explained in reference to a receive (RX) path from the cellular telephone to the user. The headset jack of the cellular telephone passes scrambled audio signal from the other party on the call to interface 110. The output of interface 110 (labeled "Ear Out") is coupled to the input of a compressor 114.

Compressor 114 compresses the dynamic range of the audio signals received from interface 110 to match the dynamic range provided by compressor 106 in the TX path. The output of compressor 114 is coupled to the RX input of scrambler 108 (labeled "RX In"). In one embodiment, compressor 114 is of similar construction as compressor 106.

Scrambler 108 unscrambles the scrambled audio received from compressor 114. The RX output of scrambler 108 (labeled "RX Out") is coupled to a volume controller 116.

Volume controller 116 adjusts the volume of the audio signals received from scrambler 108. The user may use a "VOLUME" wheel to instruct processor 120 to adjust the volume, and processor 120 in turn instructs volume controller 116 to adjust the volume. The output of volume controller 116 is coupled to the input of an earpiece amplifier 118. Earpiece amplifier 118 amplifies the audio signals received from volume controller 116 to drive the earpiece in headset 102. The output of amplifier 118 is coupled to the input of the earpiece (labeled "Ear In"). In one embodiment, amplifier 118 is an IC chip model number MAX4165 from Maxim of Sunnyvale, Calif.

Even when encryption mode is not enabled, device 100 helps to improve voice quality in cellular telephone calls by filtering out the background noises, compressing the dynamic range, and otherwise conditioning the audio signals. For example, preamplifier 104, compressor 106, compressor 114, filters 121 and 126 all help to improve cellular call quality.

Radio Mode

To listen to radio, the user presses a "RADIO" button to put device 100 into a radio mode. In response, processor 120 enables a radio tuner 124 to provide radio audio. The output of radio tuner 124 is coupled to the input of volume controller 116. In one embodiment, radio tuner 124 is an IC chip model number TEA5767HL from Phillips of the Netherlands. Processor 120 may output the status of radio tuner 124 (e.g., the current frequency) through an input/output (I/O) interface A to a display 128.

Similarly described above with the voice audio, the radio audio is passed from volume controller 116 to earpiece amplifier 118, and then from earpiece amplifier 118 to the earpiece in headset 102.

Recording Feature

Device 100 can record audios in the encryption and radio modes, and live audio received from the microphone (i.e., to function like a standard audio recorder). To record audio, the user presses a "RECORD" button. The components of device 100 involved in recording are now described.

The input of an anti-alias filter 121 is coupled to (1) the TX path at the TX output of scrambler 108 and (2) the RX path at the output of compressor 114. The input of filter 121 is also coupled to the output of radio tuner 124. Filter 121 removes false, low-frequency signals prior to analog-to-digital (A/D) conversion. The output of filter 121 is coupled to an "A/D" input of processor 120. Processor 120 includes an A/D converter that converts the analog audio signals into digital audio data. Processor 120 writes the digital audio data through an I/O interface B into a memory 122. In one embodiment, memory 122 is a SD (secure digital) memory card. As so configured, processor 120 can record voice audios from the TX and RX paths, radio audio from radio tuner 124, or any other audio picked up by the microphone.

To playback audio, the user presses a "PLAY" button. The components of device 100 involved in playback are now described. Through I/O interface B, processor 120 reads digital audio data from memory 122. Processor 120 includes a digital-to-analog (D/A) converter that converts the digital audio data to analog audio signals. The "D/A" output of processor 120 is coupled to the input of an output filter 126.

Filter 126 filters the analog audio signals. Filter 126 is a low pass, data reconstruction filter. The output of filter 126 is coupled to the RX path at the RX input of scrambler 108.

Similarly described above with live voice audio, the recorded audio is passed from scrambler 108 to volume controller 116, from volume controller 116 to earpiece amplifier 118, and from earpiece amplifier 118 to the earpiece in headset 102. As so configured, processor 120 can playback recorded voice audios from the TX and RX paths, and recorded radio audio from tuner 124 to the user. Note that processor 120 may enable scrambler 108 to unscramble voice audio that have been recorded scrambled. Furthermore, the user can press "FWD" and "REW" buttons to instruct processor 120 to search through the recorded audios in memory 122.

Temperature Sensing Feature

In one embodiment of the invention, processor 120 includes a temperature sensor 130. When the user selects the "TEMP" mode, microprocessor 120 measures the ambient temperature through sensor 130 and outputs the temperature to display 128.

Alarm Clock Feature

In one embodiment of the invention, processor 120 provides the current time on display 128. The user can use the available buttons on device 100 to set an alarm. Processor 120 will provide audio and/or visual indications to the user at the set time.

Various other adaptations and combinations of features of the embodiments disclosed are within the scope of the invention. Numerous embodiments are encompassed by the following claims.

What is claimed is:

1. A security device for a cellular telephone, comprising:

a cellular telephone interface for coupling the device to the cellular telephone;

a analog scrambler coupling a microphone and a speaker to the cellular telephone interface, the analog scrambler being able to scramble a first voice audio from the speaker and unscramble a second voice audio from the cellular telephone, wherein (1) the first voice audio travels in a transmit path comprising the microphone, the analog scrambler, and the cellular telephone interface, and (2) the second voice audio travels in a receive path comprising the cellular telephone interface, the analog scrambler, and the speaker;

an audio recorder coupled to the transmit path and the receive path for recording and playing back the first and the second voice audios, the audio recorder comprising:

a memory;

a processor comprising:

an input coupled to the transmit path and the receive path between the analog scrambler and the cellular telephone interface for recording the first and the second voice audios in the memory; and an output coupled to the receive path at the analog scrambler for playing back the first and the second voice audios from the memory.

2. The device of claim 1, wherein the cellular telephone interface comprises an audio plug.

3. The device of claim 1, further comprising:

a preamplifier coupled to the microphone;

a compressor coupled between the preamplifier and the analog scrambler, wherein the transmit path comprises the microphone, the preamplifier, the compressor, the analog scrambler, and the cellular telephone interface.

4. The device of claim 3, further comprising:

a compressor coupled between the cellular telephone interface and the analog scrambler;

a volume controller coupled to the analog scrambler; and an amplifier coupled between the volume controller and the speaker, wherein the receive path comprises the cellular telephone interface, the compressor, the analog scrambler, the volume controller, the amplifier, and the speaker.

5. The device of claim 1, further comprising:

an anti-alias filter coupled between the processor and the transmit and the receive paths;

an output filter coupled between the processor and the receive path.

6. The device of claim 1, further comprising:

a temperature sensor coupled to the processor for detecting ambient temperature.

7. The device of claim 6, further comprising:

a display coupled to the processor for displaying the ambient temperature.

8. The device of claim 1, wherein the processor further comprises an alarm clock.

9. The device of claim 1, further comprising buttons for interfacing a user to the processor.

10. The device of claim 1, wherein the microphone and the speaker comprise a headset.

* * * * *

UNITED STATES PATENT AND TRADEMARK OFFICE

CERTIFICATE OF CORRECTION

PATENT NO. : 7,209,732 B2
APPLICATION NO. : 11/044113
DATED : April 24, 2007
INVENTOR(S) : Allen Nejah et al.

It is certified that error appears in the above-identified patent and that said Letters Patent is hereby corrected as shown below:

Col. 4, line 7;
Claim 1, line 2, please delete "the device" and substitute therefore --the security device--.

Col. 4, line 9;
Claim 1, line 4, please delete "a analog" and substitute therefore --an analog--.

Col. 4, line 18;
Claim 1, line 13, please insert --and-- after the word "speaker;".

Col. 4, line 22;
Claim 1, line 17, please insert --and-- after the word "memory;".

Col. 4, line 34;
Claim 3, line 2, please insert --and-- after the word "microphone;".

Col. 4, line 50;
Claim 5, line 3, please insert --and-- after the word "paths;".

Signed and Sealed this

Ninth Day of June, 2009

John Doll

JOHN DOLL
*Acting Director of the United States Patent and Trademark Office*